US011318682B2

(12) United States Patent
Sosnowski et al.

(10) Patent No.: US 11,318,682 B2
(45) Date of Patent: May 3, 2022

(54) THREE-DIMENSIONAL (3D) OBJECT PRINTING BASED ON BUILD MATERIAL PERMEABILITY

(71) Applicant: HEWLETT-PACKARD DEVELOPMENT COMPANY, L.P., Spring, TX (US)

(72) Inventors: Luke Sosnowski, Vancouver, WA (US); Justin M. Roman, Vancouver, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 38 days.

(21) Appl. No.: 16/607,742

(22) PCT Filed: Apr. 6, 2018

(86) PCT No.: PCT/US2018/026533
§ 371 (c)(1),
(2) Date: Oct. 24, 2019

(87) PCT Pub. No.: WO2019/194826
PCT Pub. Date: Oct. 10, 2019

(65) Prior Publication Data
US 2021/0023795 A1  Jan. 28, 2021

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/364* (2017.08); *B33Y 10/00* (2014.12); *B33Y 30/00* (2014.12); *B33Y 50/02* (2014.12)

(58) Field of Classification Search
CPC ... B29C 64/393; B29C 64/364; B29C 64/106; B29C 64/314; B29C 64/343;
(Continued)

(56) References Cited
U.S. PATENT DOCUMENTS 4,274,286 A   6/1981  Gioia
4,352,718 A * 10/1982  Grun .................. F26B 3/08
                                          159/4.01

(Continued)

FOREIGN PATENT DOCUMENTS

JP        H08184554 A       7/1996
WO     WO2016205270 A1    12/2016

*Primary Examiner* — Michael J Brown
(74) *Attorney, Agent, or Firm* — HP Inc. Patent Development

(57) ABSTRACT

A system for manufacturing three dimensional objects can include logic to apply a gas with at least one flow rate to a vessel of a three dimensional printer. The logic can also detect a permeability of a build material residing within the vessel, wherein the permeability is calculated based on a plurality of pressure values detected by a plurality of pressure sensors residing in the vessel, and apply the gas with a predetermined humidity level at a second flow rate to modify the permeability of the build material residing in the vessel. Furthermore, the logic can initialize manufacturing a three dimensional object with the build material in response to detecting the permeability of the build material is below a predetermined threshold.

15 Claims, 11 Drawing Sheets

(51) Int. Cl.
*B33Y 30/00* (2015.01)
*B33Y 50/02* (2015.01)
*B29C 64/364* (2017.01)
*G05D 22/02* (2006.01)
*B33Y 40/00* (2020.01)

(58) Field of Classification Search
CPC ......... B33Y 10/00; B33Y 30/00; B33Y 50/02;
B33Y 40/00; G05D 22/02
USPC ........................................................ 700/117
See application file for complete search history.

(56) References Cited

U.S. PATENT DOCUMENTS

| | | | |
|---|---|---|---|
| 5,438,393 A | 8/1995 | Komatsu et al. | |
| 2017/0173880 A1* | 6/2017 | Desimone | B29C 64/171 |
| 2017/0334024 A1 | 11/2017 | Buller et al. | |
| 2018/0029008 A1 | 2/2018 | Li et al. | |

* cited by examiner

500A

THREE-DIMENSIONAL (3D) OBJECT PRINTING BASED ON BUILD MATERIAL PERMEABILITY

BACKGROUND

Three-dimensional (3D) printing may produce a 3D object by adding successive layers of build material, such as powder, to a build platform, then selectively solidifying portions of each layer under computer control to produce the 3D object. The build material may be powder, or powder-like material, including metal, plastic, ceramic, composite material, and other powders. In some examples the powder may be formed from, or may include, short fibers that may, for example, have been cut into short lengths from long strands or threads of material. The objects formed can be various shapes and geometries, and may be produced using a model, such as a 3D model or other electronic data source. The fabrication may involve laser melting, laser sintering, heat sintering, electron beam melting, thermal fusion, and so on. The model and automated control may facilitate the layered manufacturing and additive fabrication. The 3D printed objects may be prototypes, intermediate parts and assemblies, as well as end-use products. Product applications may include aerospace parts, machine parts, medical devices, automobile parts, fashion products, and other applications.

DESCRIPTION OF THE DRAWINGS

Certain examples are described in the following detailed description and in reference to the following drawings.

DETAILED DESCRIPTION

Introduction

Figure 1:
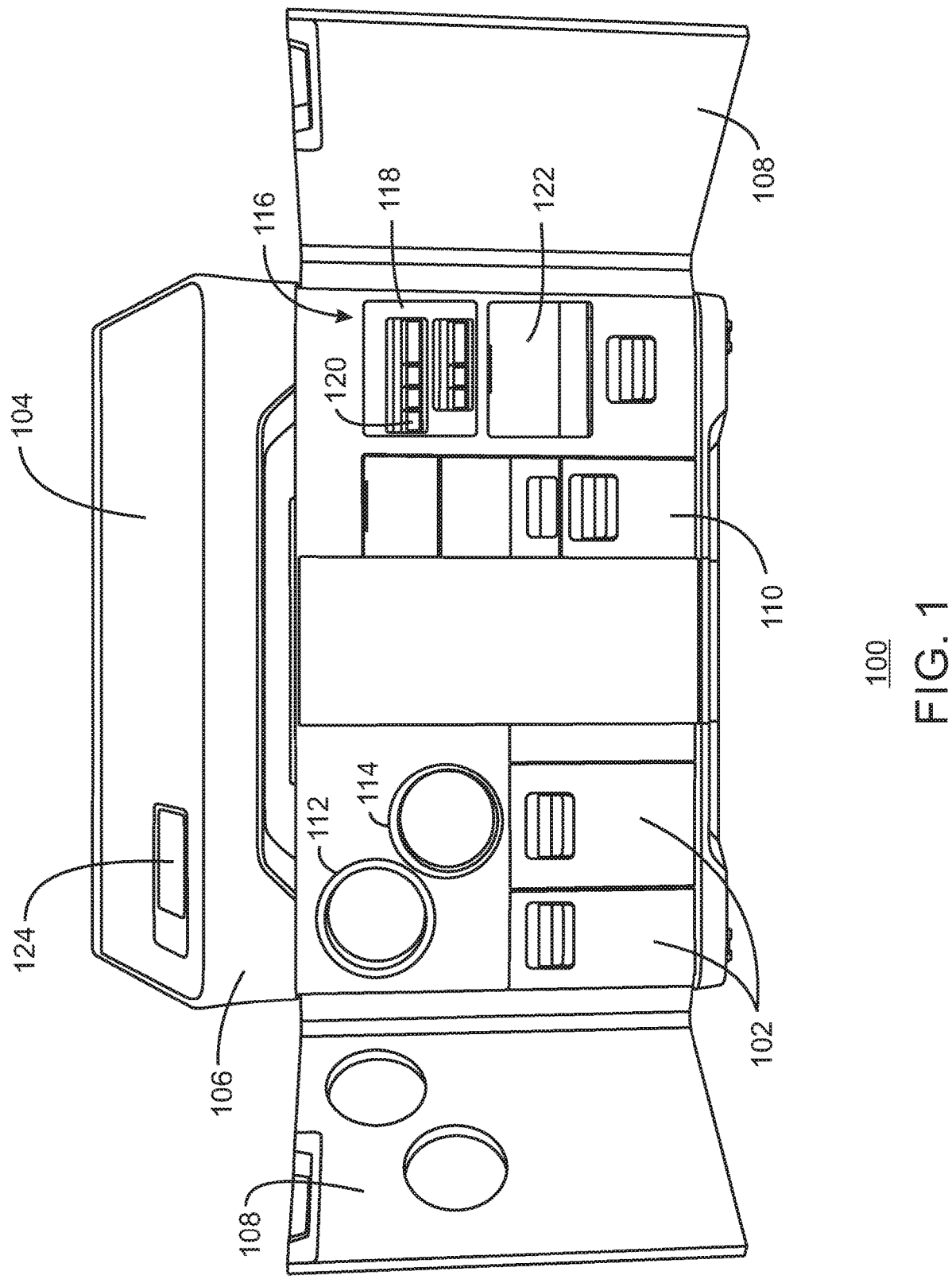
FIG. 1 is a drawing of a 3D printer, in accordance with examples.

Three dimensional printers may form 3D objects from different kinds of powder or powder-like build material. The cost of a 3D printer producing 3D objects may be related to the cost of the build material. Thus, there may be a desire for 3D printers to utilize recycled material as build material. Recycled build material may include, for example, build material that was used during a 3D printing process but which was not solidified during the 3D printing process. Such non-solidified build material may be recovered once a 3D printing process has completed and may be designated 'recycled build material' and reused in other 3D printing processes. For some applications, there may be benefit in utilizing new material because of reasons such as product purity, strength, and finish in certain instances. For some applications, a mix of new and recycled build material may be used, for example as a compromise between low cost and acceptable 3D object properties. For example, in some examples using about 20% new and about 80% recycled build material may be acceptable from both an economic and a quality perspective. Other proportions of new and recycled build material may be used depending on build material properties and acceptable object quality characteristics.

The build material may be a dry, or substantially dry, powder. In a three-dimensional printing example, the build material may have an average volume-based cross-sectional particle diameter size of between about 5 and about 400 microns, between about 10 and about 200 microns, between about 15 and about 120 microns or between about 20 and about 70 microns. Other examples of suitable, average volume-based particle diameter ranges include about 5 to about 70 microns, or about 5 to about 35 microns. As used herein, a volume-based particle size is the size of a sphere that has the same volume as the powder particle. The average particle size is intended to indicate that most of the volume-based particle sizes in the container are of the mentioned size or size range. However, the build material may include particles of diameters outside of the mentioned range. For example, the particle sizes may be chosen to facilitate distributing build material layers having thicknesses of between about 10 and about 500 microns, or between about 10 and about 200 microns, or between about 15 and about 150 microns. One example of a manufacturing system may be pre-set to distribute powdered material layers of about 80 microns using build material containers that include build material having average volume-based particle diameters of between about 40 and about 60 microns. An additive manufacturing apparatus may also be configured or controlled to form powder layers having different layer thicknesses.

As described herein, the build material can be, for example, a semi-crystalline thermoplastic material, a metal material, a plastic material, a composite material, a ceramic material, a glass material, a resin material, or a polymer material, among other types of build material. Further, the build material may include multi-layer structures wherein each particle comprises multiple layers. In some examples, a center of a build material particle may be a glass bead, having an outer layer comprising a plastic binder to agglomerate with other particles for forming the structure. Other materials, such as fibers, may be included to provide different properties, for example, strength.

Description of Examples Described Herein.

The techniques described herein can enable a 3D printer to apply a gas with at least one flow rate to a vessel of a three dimensional printer, wherein the at least one flow rate is less than a fluidization rate. The fluidization rate, as referred to herein, can indicate a rate of a gas entering a vessel that results in build material within the vessel behaving as a fluid. In some examples, the gas can enter a vessel from any suitable number of points and the gas can be introduced to the build material without displacing the build material. In some examples, the fluidization rate indicates a rate of gas that begins to displace the build material in a vessel. In some examples, the gas can include ambient air, a single gas, or a mixture of gases. The 3D printer can also detect a permeability of a build material residing within the vessel, wherein the permeability is calculated based on a plurality of pressure values detected by a plurality of pressure sensors residing in the vessel. The permeability of a build material, as referred to herein, can indicate a measure of the build material's resistance to airflow. The permeability can be based on a volume of build material and measured as gas flows through the build material from any suitable source in a 3D printer such as a humidifier generator. Additionally, the 3D printer can apply the gas with a predetermined humidity level at a second flow rate to modify the permeability of the build material residing in the vessel. For example, the gas with the predetermined humidity level can lower the permeability of the build material. Exposing build material to air of a particular humidity can increase or reduce the moisture content of the build material. For example, increasing a humidity level of the gas can increase the humidity or moisture content level of build material. Similarly, decreasing a humidity level of the gas can decrease the humidity or moisture content level of build material. Furthermore, the 3D printer can initialize manufacturing a three dimensional object with the build material in response to detecting the permeability of the build material is below a predetermined threshold.

Accordingly, the techniques herein can enable a 3D printer to monitor and adjust the permeability of a build material, such as a powder, being used to manufacture a three dimensional object. By adjusting the permeability of a build material, the 3D printer can increase the moisture content level and humidity of the build material, reduce any electrical charges or tribocharging within the build material and prevent the build material from forming clumps within transport lines of the 3D printer during a build process. In some examples, increasing the moisture content of build material can mitigate tribocharging at a faster rate. In some examples, permeability is correlated to moisture content of a build material so that a 3D printer can measure permeability of the build material to detect a moisture content of the build material and predict tribocharging of the build material. In some examples, the 3D printer can adjust the permeability of a build material to ensure a free flow of build material between storage vessels containing the build material and a build enclosure.

FIG. 1 is a drawing of a 3D printer 100, in accordance with examples. The 3D printer 100 may be used to generate a 3D object from a build material, for example, on a build platform. The build material may be a powder, and may include a plastic, a metal, a glass, or a coated material, such as a plastic-coated glass powder, among others.

The printer 100 may have covers or panels over compartments 102 for internal material vessels that hold build material. The material vessels may discharge build material through feeders into an internal conveying system for the 3D printing. The printer 100 may have a controller to adjust operation of the feeders to maintain a desired composition of build material including a specified ratio of materials in the build material. The internal material vessels may be removable via user-access to the compartments 102. The printer 100 may have a housing and components internal to the housing for handling of build material. The printer 100 has a top surface 104, a lid 106, and doors or access panels 108. The access panels 108 may be locked during operation of the 3D printer 100. The printer 100 may include a compartment 110 for an additional internal material vessel such as a recovered material vessel that recovers unfused or excess build material from a build enclosure of the printer 100.

As described in detail herein, build material may be added or removed from the 3D printer through build material containers that are horizontally inserted into supply stations. The supply stations may include a new supply station 112 for the addition of new build material, and a recycle supply station 114 for the addition of recycled build material. As described in examples, the recycle supply station 114 may also be used to offload recovered build material, for example, from the recovered material vessel. In one example, a single supply station may be provided which may be used for both adding new build material and for removing recycled build material from the printer.

In some examples, the 3D printer 100 may use a print liquid for use in a selective fusing process, or other purposes, such as decoration. For examples of a 3D printer 100 that employ a print liquid, a print-liquid system 116 may be included to receive and supply print liquid for the 3D printing. The print-liquid system 116 includes a cartridge receiver assembly 118 to receive and secure removable print-liquid cartridges 120. The print liquid system 116 may include a reservoir assembly 122 having multiple vessels or reservoirs for holding print liquid collected from the print liquid cartridges 120 inserted into the cartridge receiver assembly 118. The print liquid may be provided from the vessels or reservoirs to the 3D printing process, for example, to a print assembly or printbar above a build enclosure and build platform.

The 3D printer 100 may also include a user control panel or interface 124 associated with a computing system or controller of the printer 100. The control interface 124 and computing system or controller may provide for control functions of the printer 100. The fabrication of the 3D object in the 3D printer 100 may be under computer control. A data model of the object to be fabricated and automated control may direct the layered manufacturing and additive fabrication. The data model may be, for example, a computer aided design (CAD) model, a similar model, or other electronic source. As described with respect to FIG. 8, the computer system, or controller, may have a hardware processor and memory. The hardware processor may be a microprocessor, CPU, ASIC, printer control card, or other circuitry. The memory may include volatile memory and non-volatile memory. The computer system or controller may include firmware or code, e.g., instructions, logic, etc., stored in the memory and executed by the processor to direct operation of the printer 100 and to facilitate various techniques discussed herein.

Figure 2:
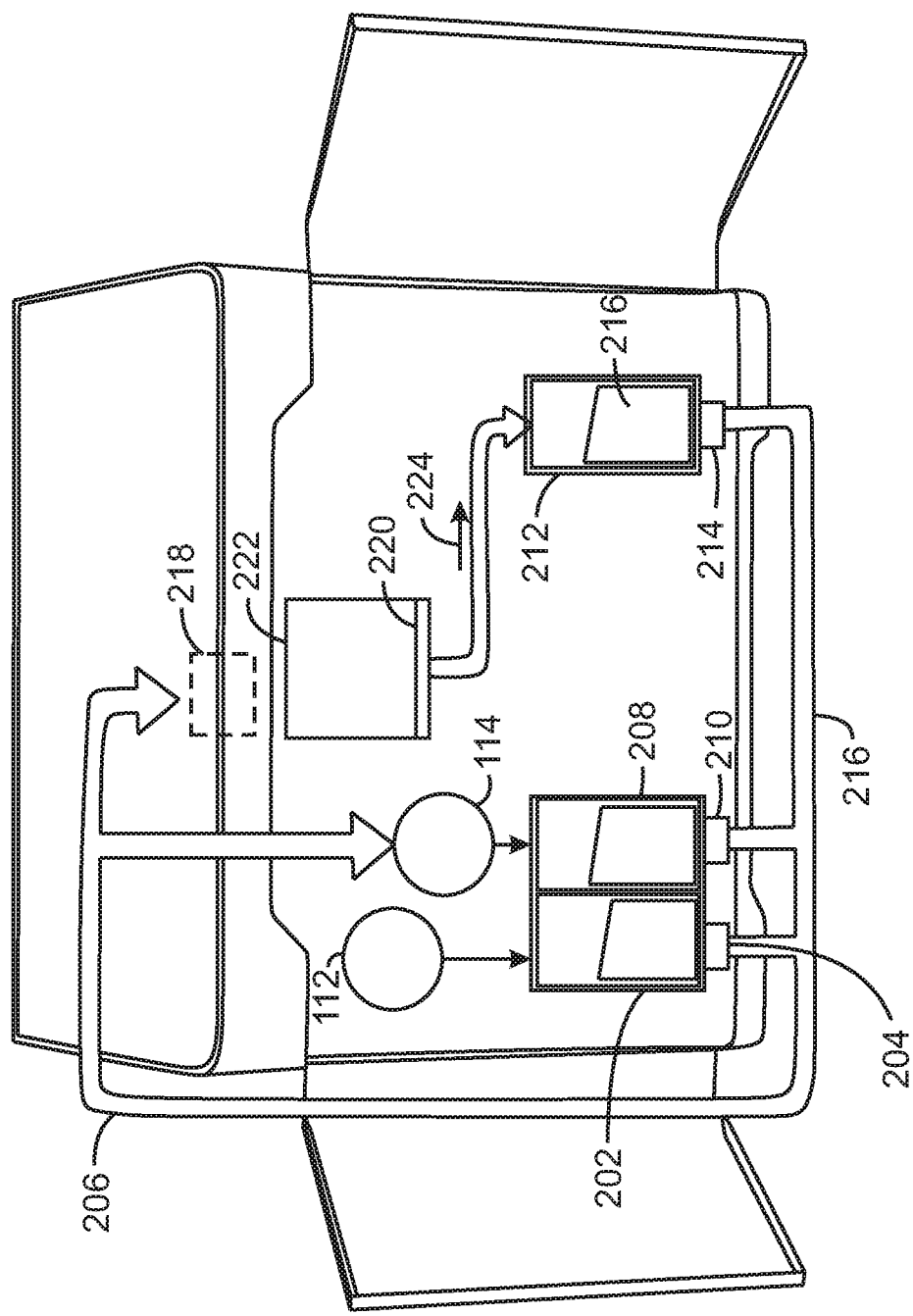
FIG. 2 is a schematic diagram of a 3D printer having a new material vessel that discharges new build material through a new feeder into a conveying system, in accordance with examples.

FIG. 2 is a schematic diagram of a 3D printer 200 having an internal new material vessel 202 that discharges new build material through a new feeder 204 into a conveying system 206, in accordance with examples. Like numbered items are as described with respect to FIG. 1. The printer 200 may include a recycle material vessel 208 to discharge recycle build material through a recycle feeder 210 to the conveying system 206. The printer 200 may have a controller to adjust operation of the feeders 204, 210 to maintain a composition and discharge rate of the build material for the 3D printing. Further, the printer 200 may include a recovered material vessel 212 to discharge recovered material 216 through a recovery feeder 214 into the conveying system 206. The conveying system 206 may transport the build material to a dispense vessel 218 which may supply build material for 3D printing. In the illustrated example, the dispense vessel 218 is disposed in an upper portion of the 3D printer 200. Moreover, although the conveying system 206 for the build material is depicted outside of the 3D printer 200 for clarity in this schematic view, the conveying system 206 is internal to the housing of the printer 200.

The 3D printer 200 may form a 3D object from the build material on a build platform 220 associated with a build enclosure 222. The 3D printing may include selective layer sintering (SLS), selective heat sintering (SHS), electron beam melting (EBM), thermal fusion, and fusing agent, chemical binder systems, such as BinderJet, metal type 3D printers, or other 3D printing and additive manufacturing (AM) technologies to generate the 3D object from the build material. In some examples, a suitable fusing agent may be an ink-type formulation comprising carbon black, such as, for example, the fusing agent formulation commercially known as V1Q600 "HP fusing agent" available from HP Inc. In one example, such a fusing agent may additionally comprise an infra-red light absorber. In one example, such an ink may additionally comprise a near infra-red light absorber. In one example, such a fusing agent may additionally comprise a visible light absorber. In one example, such an ink may additionally comprise a UV light absorber. Examples of inks comprising visible light enhancers are dye based colored ink and pigment based colored ink, such as inks commercially known as CE039A and CE042A available from HP Inc. According to one example, a suitable detailing agent may be a formulation commercially known as V1Q61A "HP detailing agent" available from HP Inc. According to one example, a suitable build material may be PA12 build material commercially known as V1R10A "HP PA12" available from HP Inc. Recovered build material 224, for example, non-solidified or excess build material, may be recovered from the build enclosure 222. The recovered build material 224 may be treated and returned to the recovered material vessel 212.

Further, the printer 200 may include a new supply station 112 and a recycle supply station 114 to hold build material containers inserted by a user along a horizontal, or generally horizontal, axis. The supply stations 112 and 114 may provide new or recycled build material for the 3D printing to the new and recycle material vessels 202 and 208, respectively. Further, the conveying system 206 may return recovered material 216 to the recycle supply station 114. The recovered material 216 may be offloaded by being added to a build material container inserted in the recycle supply station 114, or may be diverted through the recycle supply station 114 to the recycle material vessel 208.

Lastly, as noted, the build material including the first material and the second material may be powder. A powder may be a granular material with a narrow size distribution, such as beads, or other shapes of small solids that may flow and be conveyed in an air stream. As used herein, the term "powder" as build material can, for example, refer to a powdered, or powder-like, material which may be layered and sintered via an energy source or fused via a fusing agent, or a fusing agent and energy source in a 3D printing job. In some examples, the build material may be formed into a shape using a chemical binder, such as a solvent binder or a reaction promoter. The build material can be, for example, a semi-crystalline thermoplastic material, a metal material, a plastic material, a composite material, a ceramic material, a glass material, a resin material, or a polymer material, among other types of build material.

Figure 3:
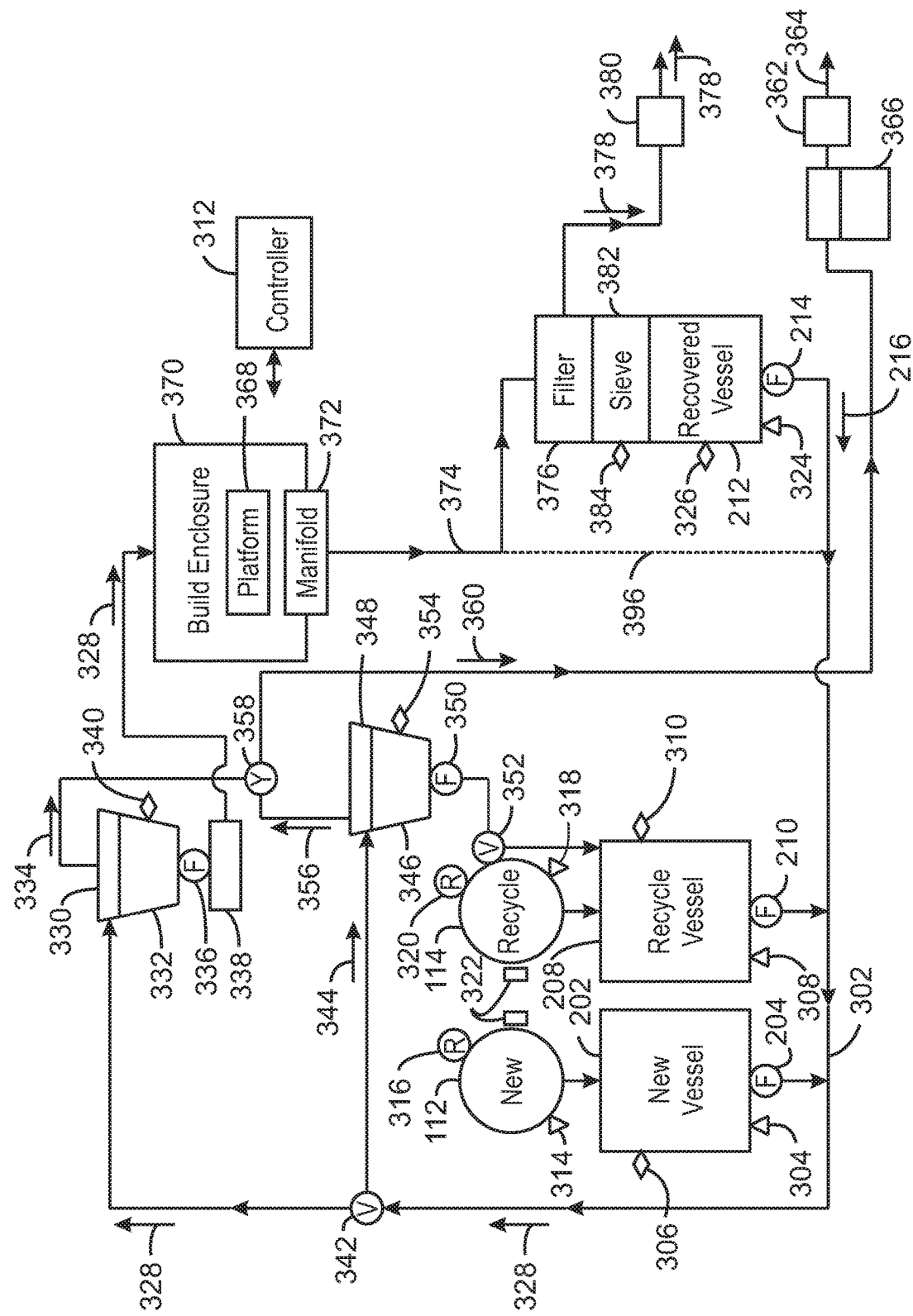
FIG. 3 is a block diagram of a 3D printer without a humidifying system, in accordance with examples.

FIG. 3 is a block diagram of a 3D printer 300 without a humidifying system, in accordance with examples. Like numbered items are as described with respect to FIGS. 1 and 2. As shown in this drawing, material flows are shown by labelled arrows placed along conveying lines or conduits, which may be separately labeled. In this example, the 3D printer 300 may have a new material vessel 202 that discharges new material through a feeder 204, such as a rotary feeder, auger, or screw feeder, into a first conveying system 302, which may be a pneumatic conveying system. The feeder 204 may drop the new material into a conduit of the conveying system 302. The feeder 204 may meter or regulate material discharge or otherwise facilitate dispensing of the desired amount of new material from the new material vessel 202 into the first conveying system 302. In addition, the 3D printer 300 may include a recycle material vessel 208 that discharges recycle material through a feeder 210 into the first conveying system 302.

The new material vessel 202 may have a weight sensor 304 and a fill level sensor 306. Likewise, the recycle material vessel 208 may have a weight sensor 308 and a fill level sensor 310. A controller 312 of the printer 300, as described with respect to FIG. 8, may adjust operation of the feeders 204 and 210 in response to indications of material discharge amount or rate provided by the weight sensors 304 and 308. The controller may adjust operation of the feeders 204 and 210 to maintain a desired ratio of new material to recycle material. In examples described herein, the controller 312 may control the dispensing of build material from a build material container, or the offloading of build material to a build material container.

The 3D printer 300 may include a new supply station 112 to hold a build material container for adding new build material in a cylindrical cage, along a horizontal axis. The new material vessel 302 may receive new build material from the build material container held by the new supply station 112. As described herein, the new supply station 112 may include several sensors and actuators to determine if a build material container is present, and control the dispensing of build material from the build material container. The sensors may include a weighing device 314 that may be used to determine the weight of the new supply station 112 and the build material container. The actuators may include a motor 316 to rotate the cylindrical cage in a first angular direction to dispense build material to the new material vessel 202.

The number of rotations of the cylindrical cage may be used to control the dispensing of an expected amount of build material from a build material container. Accordingly, the motor 316 may be a stepper motor, a servo motor, or other type of motor that may be used to control the number of revolutions and the speed of the rotation. In some examples, a motor having a controlled speed, such as a motor control using pulse width modulation or pulse frequency modulation, may be used with a sensor that counts the number of revolutions. For example, a base position sensor as described herein may be used to count the revolutions.

The 3D printer 300 may include a recycle supply station 114 to hold a build material container for recycled material. As described for the new supply station 112, the recycle supply station 114 may include several sensors and actuators to determine if a build material container is present, and control the dispensing of recycled build material from the build material container, for example, into a recycled material vessel. The sensors may include a weighing device 318 that may be used to determine the weight of the recycle supply station 114 and a build material container. The actuators may include a motor 320 to rotate the cylindrical cage in a first angular direction to dispense build material to the recycle material vessel 208. The recycle supply station 114 may also rotate the cylindrical cage in a second angular direction, opposite the first angular direction, to add recovered or recycled material to the build material container.

The new supply station 112 and the recycle supply station 114 may also include several other sensors and actuators 322 to provide functionality, as described in greater detail herein. The other sensors and actuators 322 may include a latching sensor to determine if a build material container is secured in a supply station, and a position sensor to determine if a build material container is in a base position, among others. As used herein, a base position is an initial position of the build material container after insertion into a supply station 112 or 114. In the base position, sensors and actuators 322 on a support structure may interact with the cylindrical cage. Further, the sensors and actuators 322 may include actuators to actuate a valve on the build material container, for example, opening or closing the valve, or advance the read head to an information chip on a build material container, among others.

As described herein, the printer 300 may include a recovered material vessel 212 which discharges recovered material 216 through a recovery feeder 214 into the first conveying system 302. The recovered material vessel 212 may have a weight sensor 324 and a fill level sensor 326. Accordingly, the build material 328 may include recovered material 216 from the recovered material vessel 212 in addition to the recycle material from the recycle material vessel 208 and new material from the new material vessel 202.

Conveying air may flow through the first conveying system 302. An air intake such as a filtered manifold or an open conduit as may receive, pull in, and/or filter air (e.g., ambient air) as conveying air for the first conveying system 302. The air may also be used for the second conveying system discussed below. The first conveying system 302 may transport the build material 328, e.g., a mix of new material, and recycle material from the vessels 202 and 208, respectively. In some instances, the build material 328 may also include recovered material 216. In the illustrated example, the first conveying system 302 may convey the build material 328 to a separator 330 associated with a dispense vessel 332. The dispense vessel 332 may be a feed vessel. The separator 330 may include a cyclone, a screen, a filter, and the like. The separator 330 may separate conveying air 334 from the build material 328.

After the conveying air 334 has been separated, the build material 328 may flow into the dispense vessel 332. A feeder 336 may receive build material from the dispense vessel 332 and discharge the build material to a build material handling system 338 for the 3D printing. The dispense vessel 332 may have a fill level sensor 340. The fill level sensor 340 may measure and indicate the level or height of build material in the dispense vessel 332.

The first conveying system 302 may divert build material 328 via a diverter valve 342. The diverted material 344 may be sent to an alternate vessel 346 through a separator 348 such as cyclone, filter, etc. The alternate vessel 346 may discharge the diverted material 344 through a feeder 350 and diverter valve 352 to either a build material container in the supply station 114, or to the recycle material vessel 208. As described in examples herein, the diverter valve 352 may be part of a valve mechanism used to dispense recycled build material from a build material container.

This diversion of build material 328 by diverter valve 342 as recycle material 344 may occur, for instance, when the build material 328 is primarily recycle material or recovered material 216. This may be performed to offload material, for example, by diverting the material through diverter valve 352 to a build material container. In other examples, the recycle material 344 may be sent by the diverter valve 352 to the recycle material vessel 208. As with other material vessels, the alternate vessel 346 may have a fill level sensor 354.

The separator 348 associated with the alternate vessel 346 may remove conveying air 356 from the build material 328. After the conveying air 356 is removed from the build material 328, the build material 328 may discharge from the separator 348 into the alternate vessel 346. In the illustrated example, the conveying air 356 from the separator 348 may flow to a Y-fitting 358, where the conveying air 356 is combined with the conveying air 334 from the separator 330 associated with the dispense vessel 332. The Y-fitting 358 may be a conduit fitting having two inlets and one outlet. The combined conveying air 360 may be pulled from the Y-fitting 358 by a motive component 362 of the first conveying system 302 and discharged 364 to the environment or to additional equipment for further processing. In some examples, the combined conveying air 360 may flow through a filter 366 as it is being pulled out by the motive component 362. The filter 366 may remove particulates from the conveying air 360 before it is discharged 364.

The motive component 362 applies motive force for the conveying air in the first conveying system 302 to transport build material. The motive component 362 may be an air blower, eductor, ejector, vacuum pump, compressor, or other motive component. Because the first conveying system 302 is generally a pneumatic conveying system, the motive component may typically include a blower such as a centrifugal blower, fan, axial blower, and the like.

As for the 3D printing, as mentioned, the dispense vessel 332 may discharge the build material 328 through a feeder 336 to the build material handling system 338. The feeder 336 and the build material handling system 338 may provide a desired amount of build material 328 across a build platform 368, for example, in layers. The build material handling system 338 may include a feed apparatus, dosing device, build-material applicator, or powder spreader, and the like, to apply the build material to the build platform 368 in the build enclosure 370. The printer 300 may form a 3D object from build material 328 on the build platform 368.

After the 3D object is complete or substantially complete on the build platform 368, a vacuum manifold 372 may remove excess build material from the build enclosure 370 into a second conveying system 374 as recovered material. In some examples, a second conveying system 374 is not used. For example, the excess build material may be offloaded with the 3D object or removed by a stand-alone vacuum.

If the second conveying system 374 is used, it may convey the recovered material through a cyclone or filter 376 to separate the recovered material from the conveying air 378. The conveying air 378 is discharged through a motive component 380 of the second conveying system 374. A filter may be included to remove particulates from the conveying air 378. The motive component 380 may be a blower, fan, eductor, ejector, vacuum pump, or other type of motive component. In this example, the recovered material may discharge from the cyclone or filter 376 and enter a sieve 382 where larger particles, such as solidified build material not incorporated into the 3D object, may be removed. The sieve 382 may have a fill level sensor 384 which monitors the level or height of solid material in the sieve 382.

After separation of the larger particles, the recovered build material may enter the recovered material vessel 212.

In some examples, the recovered material may bypass the cyclone or filter 376, sieve 382, and recovered material vessel 212 and flow into a conduit of the first conveying system 302, as indicated by the dashed line 396. The vessels, conveying systems, and associated equipment of the 3D printer 300 may include instrumentation such as pressure sensors and temperature sensors, and the like.

The 3D printer 300 may fabricate objects as prototypes or products for aerospace (e.g., aircraft), machine parts, medical devices (e.g., implants), automobile parts, fashion products, structural and conductive metals, ceramics, and so forth. In one example, the 3D objects formed by the 3D printer 300 are mechanical parts which may be metal or plastic, and which may be equivalent or similar to mechanical parts produced by other fabrication techniques, for example, injection molding or blow molding, among others.

Figure 4:
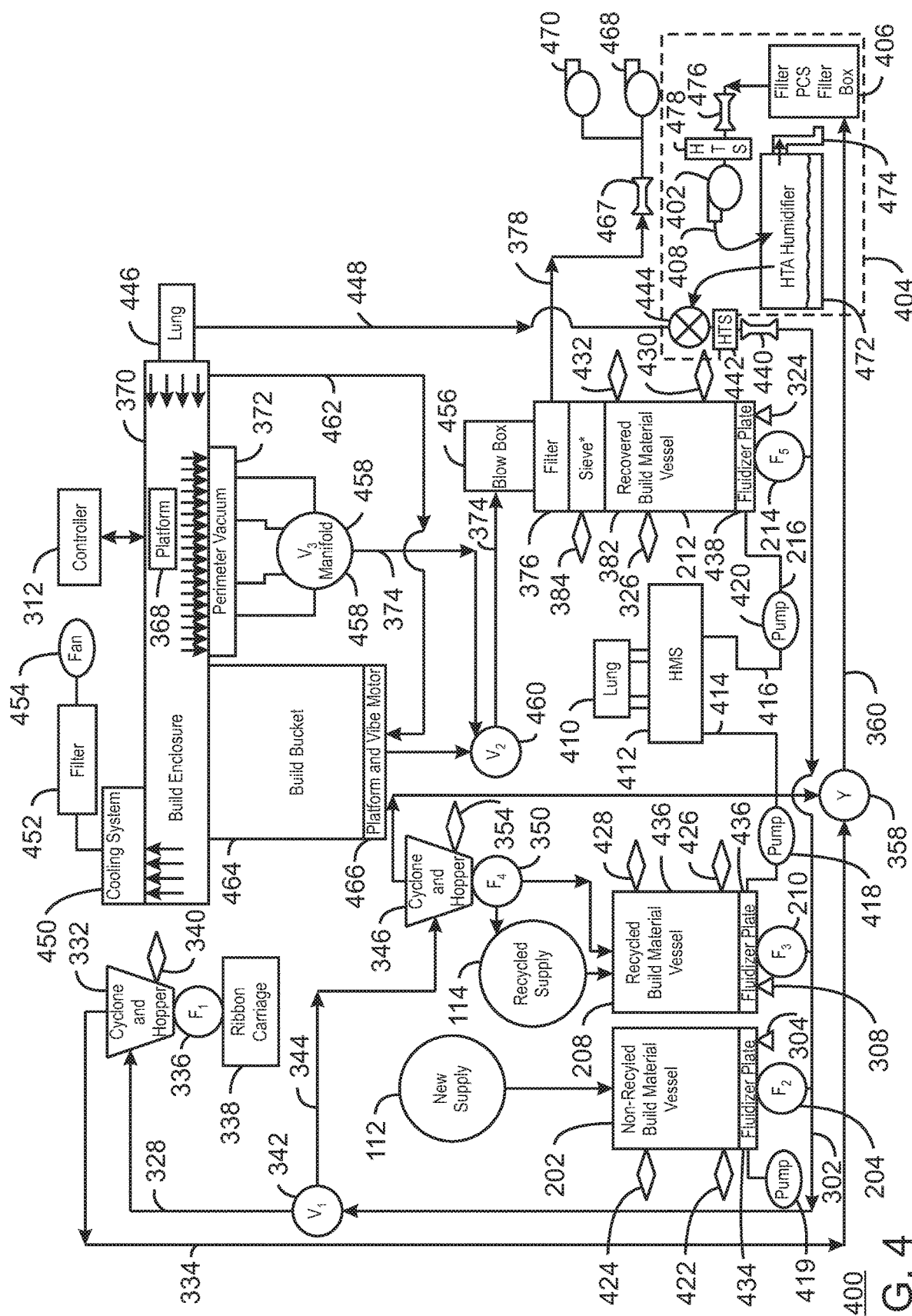
FIG. 4 is a block diagram of a 3D printer with a humidifying system, in accordance with examples.

FIG. 4 is a block diagram of a 3D printer with a humidifying system. The 3D printer 400 can provide humidity to build material stored in build material vessels in accordance with examples. Like numbered items are as described with respect to FIGS. 1, 2, and 3. As shown in this drawing, material flows are shown by labelled arrows placed along conveying lines or conduits, which may be separately labeled. In this example, the 3D printer 400 may have a new material vessel 202 that discharges new material through a feeder 204, such as a rotary feeder, auger, or screw feeder, into a first conveying system 302, which may be a pneumatic conveying system. The feeder 204 may drop the new material into a conduit of the conveying system 302. The feeder 204 may meter or regulate material discharge or otherwise facilitate dispensing of the desired amount of new material from the new material vessel 202 into the first conveying system 302. In addition, the 3D printer 400 may include a recycle material vessel 208 that discharges recycle material through a feeder 210 into the first conveying system 302.

The new material vessel 202 may have a weight sensor 304. Likewise, the recycle material vessel 208 may have a weight sensor 308. A controller 312 of the printer 400, as described with respect to FIG. 8, may adjust operation of the feeders 204 and 210 in response to indications of material discharge amount or rate provided by the weight sensors 304 and 308. The controller 312 may adjust operation of the feeders 204 and 210 to maintain a desired ratio of new material to recycle material. In examples described herein, the controller 312 may control the dispensing of build material from a build material container, or the offloading of build material to a build material container.

The 3D printer 400 may include a new supply station 112 to hold a build material container for adding new build material in a cylindrical cage, along a horizontal axis. The new material vessel 202 may receive new build material from the build material container held by the new supply station 112. As described herein, the new supply station 112 may include several sensors and actuators to determine if a build material container is present, and control the dispensing of build material from the build material container.

The 3D printer 400 may include a recycle supply station 114 to hold a build material container for recycled material. As described for the new supply station 112, the recycle supply station 114 may include several sensors and actuators to determine if a build material container is present, and control the dispensing of recycled build material from the build material container, for example, into a recycled material vessel. The recycle supply station 114 may also rotate the cylindrical cage in a second angular direction, opposite the first angular direction, to add recovered or recycled material to the build material container.

As described herein, the printer 400 may include a recovered material vessel 212 which discharges recovered material 216 through a recovery feeder 214 into the first conveying system 302. The recovered material vessel 212 may have a weight sensor 324 and a fill level sensor 326. Accordingly, the build material may include recovered material 216 from the recovered material vessel 212 in addition to the recycle material from the recycle material vessel 208 and new material from the new material vessel 202.

Conveying air may flow through the first conveying system 302. An air intake such as a filtered manifold or an open conduit as may receive, pull in, and/or filter air (e.g., ambient air) as conveying air for the first conveying system 302. The air may also be used for the second conveying system discussed below. The first conveying system 302 may transport the build material, e.g., a mix of new material, and recycle material from the vessels 202 and 208, respectively. In some instances, the build material may also include recovered material 216. In the illustrated example, the first conveying system 302 may convey the build material 328 to a dispense vessel 332. The dispense vessel 332 may be a feed vessel.

A feeder 336 may receive build material from the dispense vessel 332 and discharge the build material to a ribbon cartridge or build material handling system 338 for the 3D printing. The dispense vessel 332 may have a fill level sensor 340. The fill level sensor 340 may measure and indicate the level or height of build material in the dispense vessel 332.

The first conveying system 302 may divert build material 328 via a diverter valve 342. The diverted material 344 may be sent to an alternate vessel 346 through a separator such as cyclone, filter, etc. The alternate vessel 346 may discharge the diverted material 344 through a feeder 350 to either a build material container in the supply station 114, or to the recycle material vessel 208.

This diversion of build material 328 as recycle material 344 may occur, for instance, when the build material 328 is primarily recycle material or recovered material 216. This may be performed to offload material, for example, by diverting the material to a build material container. In other examples, the recycle material 344 may be sent to the recycle material vessel 208. As with other material vessels, the alternate vessel 346 may have a fill level sensor 354.

In some examples, a separator (not depicted) associated with the alternate vessel 346 may remove conveying air 356 from the build material 328. After the conveying air 356 is removed from the build material 328, the build material 328 may discharge from the separator into the alternate vessel 346. In the illustrated example, the conveying air 356 from the separator may flow to a Y-fitting 358, where the conveying air 356 is combined with the conveying air 334 from the dispense vessel 332. The Y-fitting 358 may be a conduit fitting having two inlets and one outlet. The combined conveying air 360 may be pulled from the Y-fitting 358 by a motive component 402 of the separate humidified transport air (HTA) humidifier 404 through a filter 406 and discharged 408 into the HTA humidifier 404. The filter 406 may remove particulates from the conveying air 360 before it is discharged 408. The HTA humidifier 404 can provide humidified air to the conduit lines that transport build material from the new vessel 202, recycle vessel 208, and recovered vessel 212 to the build enclosure 370.

The motive component 402 applies motive force for the conveying air in the first conveying system 302 to transport build material. The motive component 402 may be an air blower, eductor, ejector, vacuum pump, compressor, or other motive component. Because the first conveying system 302 is generally a pneumatic conveying system, the motive component may typically include a blower such as a centrifugal blower, fan, axial blower, and the like.

As for the 3D printing, as mentioned, the dispense vessel 332 may discharge the build material 328 through a feeder 336 to the build material handling system 338. The feeder 336 and the build material handling system 338 may provide a desired amount of build material 328 across a build platform 368, for example, in layers. The build material handling system 338 may include a feed apparatus, dosing device, build-material applicator, or powder spreader, and the like, to apply the build material to the build platform 368 in the build enclosure 370. The printer 400 may form a 3D object from build material 328 on the build platform 368.

After the 3D object is complete or substantially complete on the build platform 368, a vacuum manifold 372 may remove excess build material from the build enclosure 370 into a second conveying system 374 as recovered material. In some examples, a second conveying system 374 is not used. For example, the excess build material may be off-loaded with the 3D object or removed by a stand-alone vacuum.

In some examples, the 3D printer 400 can also include a lung 410 that can provide air to a humidifier management system (HMS) 412. The HMS 412 can transmit the conditioning agent through conduits 414 and 416 and pumps 418, 419, and 420 to the new vessel 304, recycle vessel 310, and recovered vessel 212. The conditioning agent, as referred to herein, can include water vapor added to ambient air to result in humidified air, among others.

In some examples, the new vessel 202, recycle vessel 208, and recovered vessel 212 can include any suitable number of pressure sensors 422, 424, 426, 428, 430, and 432. In some examples, the new vessel 202, recycle vessel 208, and recovered vessel 212 can include at least two pressure sensors, in which one pressure sensor is located at the bottom of the new vessel 202, recycle vessel 208, and recovered vessel 212 and a separate pressure sensor is located proximate a top of the new vessel 202, recycle vessel 208, and recovered vessel 212. In some examples, logic or a controller 312 attached to the pressure sensors 422, 424, 426, 428, 430, and 432 can detect pressure differentials. For example, the logic or controller 312 can determine a different pressure exists between a bottom of new vessel 202, recycle vessel 208, or recovered vessel 212 and a top of new vessel 202, recycle vessel 208, or recovered vessel 212.

In some examples, the logic or controller 312 can apply a gas with at least one flow rate to the new vessel 202, recycle vessel 208, or recovered vessel 212 of the three dimensional printer 400, wherein the at least one flow rate is less than a fluidization rate. The gas can include atmospheric air comprising nitrogen, oxygen, argon, and carbon dioxide, among others. In some examples, the gas can include any suitable number or mixtures of gases. In some examples, the logic or controller 312 can also detect a permeability of a build material residing within the new vessel 202, recycle vessel 208, or recovered vessel 212, wherein the permeability is calculated based on a plurality of pressure values detected by the pressure sensors pressure sensors 422, 424, 426, 428, 430, and 432 residing in the new vessel 202, recycle vessel 208, or recovered vessel 212. In some examples, the logic or controller 312 can also apply the gas with a predetermined humidity level at a second flow rate to modify the permeability of the build material residing in the new vessel 206, recycle vessel 208, or recovered vessel 212. The predetermined humidity level can be provided by the HMS 412 and applied to a gas provided by the lung 410. In some examples, the logic or controller 312 can initialize manufacturing a three dimensional object with the build material in response to detecting the permeability of the build material is below a predetermined threshold. In some examples, the conditioning fluid and air provided by the HMS 412 can be provided to the new vessel 202, recycle vessel 208, and recovered vessel 212 via fluidizer plates 434, 436, and 438.

In some examples, the HTA 404 can provide a gas and a conditioning agent, such as humidified air, to the conduit lines transporting build material. In some examples, the HTA 404 can transmit the gas and the conditioning agent to the conduit lines via an inlet venturi 440 and an HTS 438 and a diverter valve 444. The HTA 404 can provide humidified air to the conduit lines, in some examples, to ensure that build material is transported freely between the new vessel 202, recycle vessel 208, and recovered vessel 212 and the build enclosure 370.

In some examples, the build enclosure 370 can receive a gas from a lung 446 that also provides the gas 448 to the HTA 404. In some examples, the build enclosure 370 can also be coupled to a cooling system 450 that can extract exhaust air from the build enclosure 370 and transport the exhaust air to a filter 452 and a fan 454.

The build enclosure 370 can be coupled to a perimeter vacuum 372 that can couple to any suitable number of conduit lines that transmit air from the build enclosure 370 to a blow box 456 via valve manifold V3 458 and valve V2 460. In some examples, the valve manifold V3 458 can have any suitable number of selectable positions including an off position. In some examples, the build enclosure 370 can also be coupled to a conduit line 462 that transports air from within the build enclosure 370 to a build bucket 464 through a platform and vibration motor 466. The build bucket 464 can store excess build material from the build enclosure 370 that can be transported via valve V2 458 to the blow box 456.

If the second conveying system 374 is used, it may convey the recovered material through the blow box 456 to a cyclone or filter 376 to separate the recovered material from the conveying air 378. The blow box 456 can provide the excess build material to the filter 376, sieve 382, and recovered vessel 212. If the second conveying system 374 is used, it may convey the recovered material through a cyclone or filter 376 to separate the recovered material from the conveying air 378. The conveying air 378 is discharged through a venture 467 and motive component 468 or 470 of the second conveying system 374. A filter may be included to remove particulates from the conveying air 378. The motive components 468 and 470 may blowers, fans, eductors, ejectors, vacuum pumps, or any other type of motive component. In this example, the recovered material may discharge from the cyclone or filter 376 and enter a sieve 382 where larger particles, such as solidified build material not incorporated into the 3D object, may be removed. The sieve 382 may have a fill level sensor 384 which monitors the level or height of solid material in the sieve 382.

After separation of the larger particles, the recovered build material may enter the recovered material vessel 212. In this example, the recovered material may discharge from the cyclone or filter 376 and enter sieve 382 where larger particles, such as solidified build material not incorporated into the 3D object, may be removed. The vessels, conveying systems, and associated equipment of the 3D printer 400 may include instrumentation such as pressure sensors and temperature sensors, and the like.

The 3D printer 400 may fabricate objects as prototypes or products for aerospace (e.g., aircraft), machine parts, medical devices (e.g., implants), automobile parts, fashion products, structural and conductive metals, ceramics, and so forth. In one example, the 3D objects formed by the 3D printer 400 are mechanical parts which may be metal or plastic, and which may be equivalent or similar to mechanical parts produced by other fabrication techniques, for example, injection molding or blow molding, among others.

The 3D printer 400 may include fewer or additional components. For example, the HTA humidifier 404 can also include a water tank 472 that provides water vapor to the diverter valve 444. The HTA humidifier 404 can also include a safety overflow feature 474 to transport water from the water tank 472 to outside of the 3D printer 400. The HTA humidifier 404 can also include an outlet venturi 476 and HTS 478 to facilitate conveying gas from the filter 406 to the motive component 402. In some examples, the HTA humidifier 404 can provide a second conditioning agent to at least one pneumatic air transport line for transporting the build material from at least one vessel to a second vessel or a build enclosure.

Figure 5A:
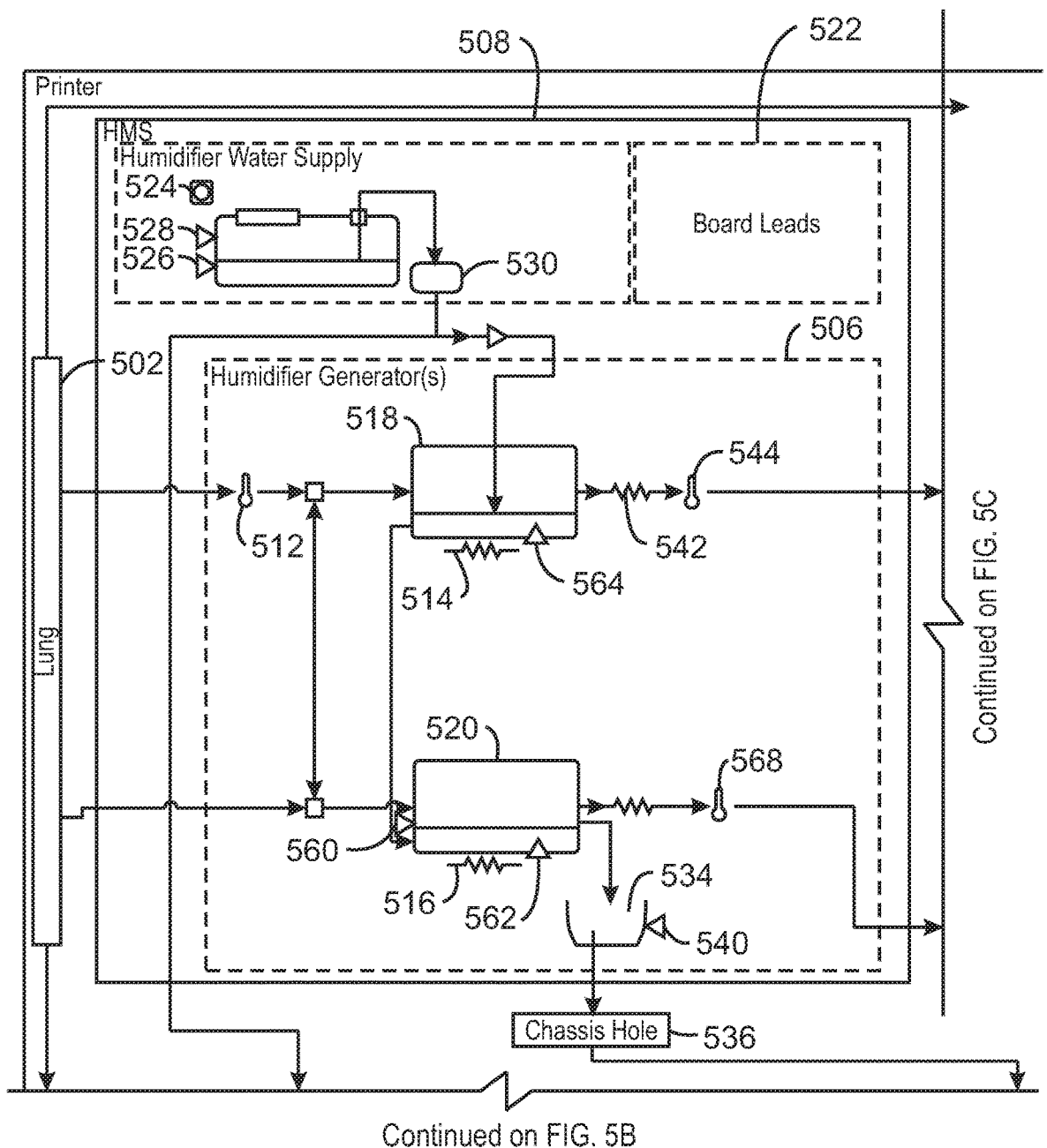
FIGS. 5A, 5B, and 5C depict a block diagram of a humidifier control for a 3D printer, in accordance with examples.
Figure 5B:
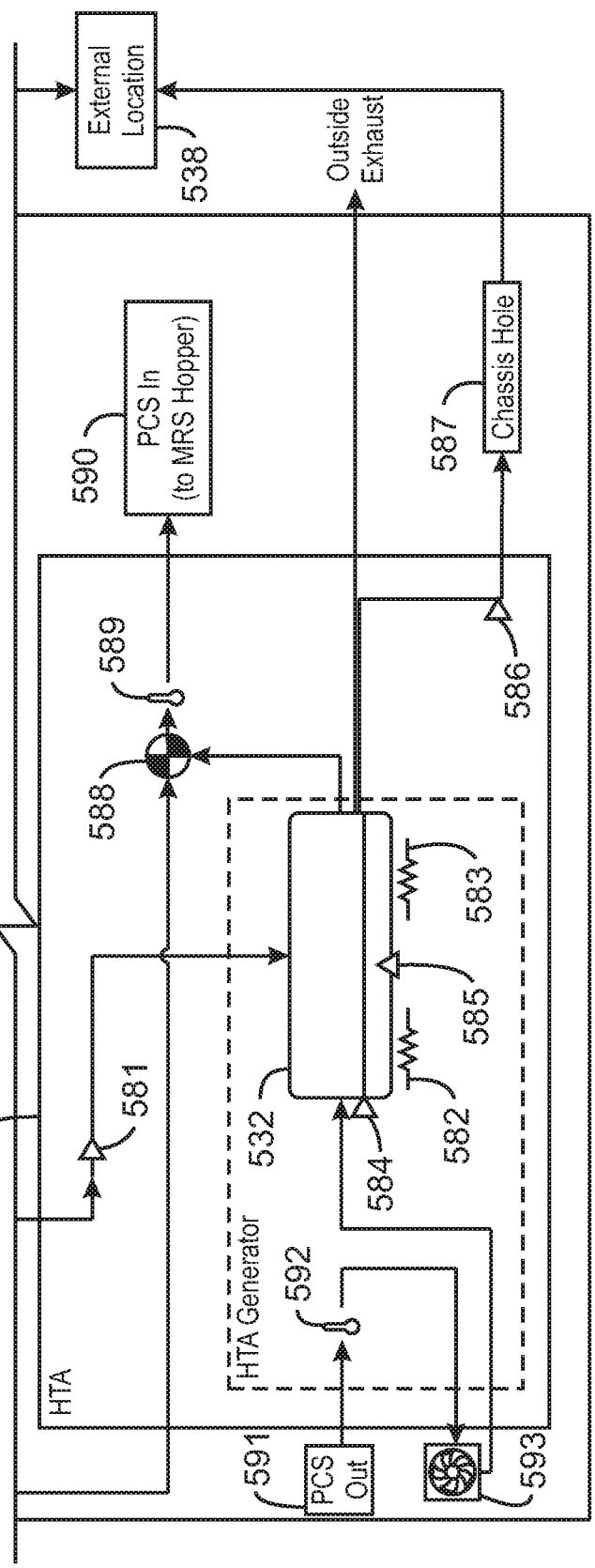
Figure 5C:
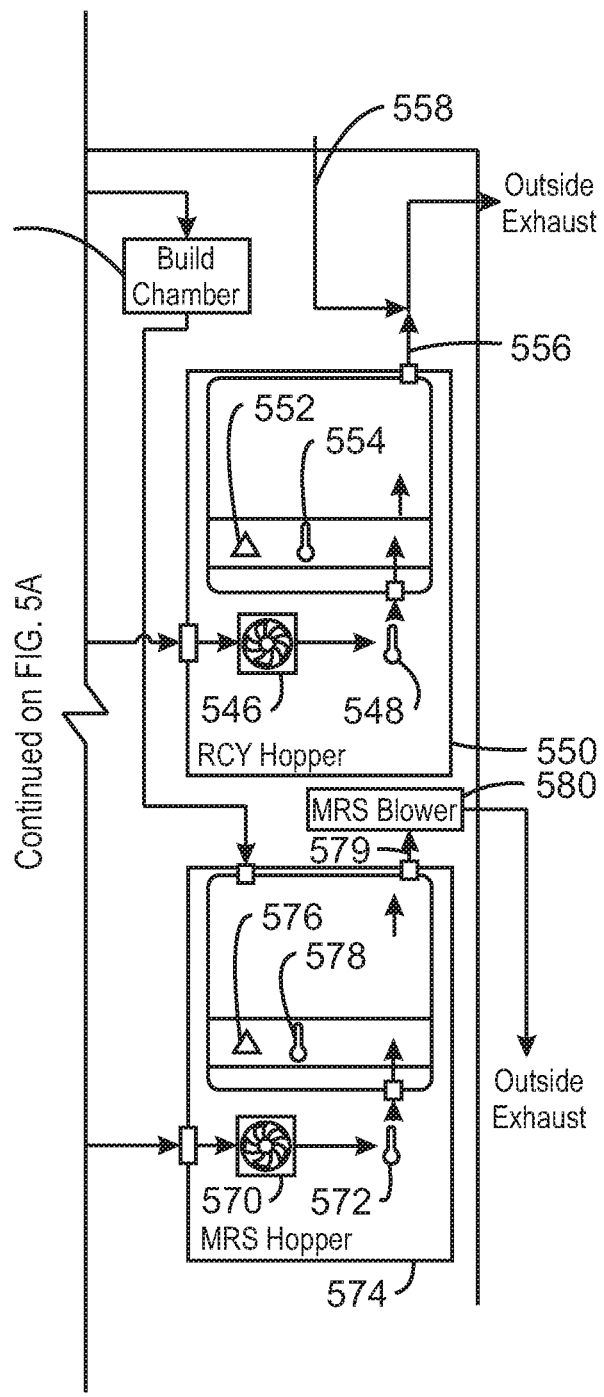

FIGS. 5A, 5B, and 5C depict a block diagram of a humidifier control for a 3D printer, in accordance with examples. In some examples, a lung 502 of FIG. 5A can provide any suitable gas or mixture of gases to a build enclosure 504 illustrated in FIG. 5C, a humidifier generator 506 residing within a humidifier management system (HMS) 508, and a humidity transport air (HTA) module 510 illustrated in FIG. 5B.

In some examples, the gas from the lung 502 can be monitored by a relative humidity and temperature sensor 512 in the humidifier generator 506. In some examples, the gas from the lung 502 is applied to the two water heaters 514 and 516 corresponding to water reservoirs 518 and 520 respectively. In some examples, water reservoir 518 receives water from the humidifier water supply 522 in the HMS 508. The HMS 508 can include a light emitting diode (LED) 524 that can flash any suitable number of times to indicate if the water heaters 514 and 516 are active, if the HMS 508 is configurable, or if the HMS 508 has a connection with the humidifier generator 506. In some examples, the humidifier water supply 522 can also include a water level sensor 526 to indicate a level of the water stored in the humidified water supply 522 and a PSNC sensor 528. In some examples, the water provided from the humidified water supply 522 to the water reservoir 518 flows through any suitable type of pump 530. In some examples, the water from the humidified water supply 522 can also be transported to a water reservoir 532 residing in the HTA module 510 of FIG. 5B.

In some examples, the water reservoir 518 can be coupled to the water reservoir 520 to provide water. The water reservoir 520 can include an overflow valve 534 that transports water through a chassis hole 536 to an external location 538 of FIG. 5B outside of the three dimensional printer 500. The overflow valve 534 can include a switch 540 in some examples. In some examples, the water reservoir 518 can provide heated water vapor through a water heater 542 and a relative humidity and temperature sensor 544 in the humidifier generator 506 and a fan or blower 546 (illustrated in FIG. 5C) and a real humidity and temperature sensor 548 in a recycled build material vessel 550. In some examples, the recycled build material vessel 550 can store recycled build material from previous builds within the three dimensional printer 500. The recycled build material vessel 550 can include a thermistor 552 to detect a resistance dependent on temperature within the recycled build material and a relative humidity and temperature sensor 554 to detect the relative humidity and the temperature of the recycled build material. In some examples, exhaust 556 from the recycled build material vessel 550 can be mixed with internal cooling air 558 as the exhaust 556 exits a top of the recycled build material vessel 550.

In some examples, the water reservoir 520 of FIG. 5A can include a water tank sensor 560 to monitor a level of the water stored in the water reservoir 520. The water reservoir 520 can also include a thermistor 562 to detect a resistance of the water stored in the water reservoir 520 based on a resistance dependent on temperature. In some examples, the water reservoir 518 can also include a thermistor 564 to detect a resistance of the water stored in the water reservoir 518. In some examples, the water reservoir 520 can provide heated water vapor through a water heater 566 and a relative humidity and temperature sensor 568 in the humidifier generator 506 and a fan or blower 570 (illustrated in FIG. 5C) and a real humidity and temperature sensor 572 in a non-recycled build material vessel 574. In some examples, the non-recycled build material vessel 574 can store non-recycled build material that is new to the three dimensional printer 500 and not from previous builds. The non-recycled build material vessel 574 can include a thermistor 576 to detect a resistance dependent on temperature within the non-recycled build material and a relative humidity and temperature sensor 578 to detect the relative humidity and the temperature of the non-recycled build material. In some examples, exhaust 579 from the non-recycled build material vessel 574 can be transported from a top of the non-recycled build material vessel 574 through a blower 580. In some examples, the non-recycled build material vessel 574 can receive air from the build enclosure 504.

In some examples, the HTA module 510 can include the water reservoir 532 that can receive water from the humidified water supply 516 via a water valve 581. In some examples, the water reservoir 532 can include any number of water heaters 582, 583, water tank sensor 584, and a thermistor 585 that can detect the resistance dependent on temperature of the water stored in the water reservoir 532. In some examples, the water from the water reservoir 532 can overflow through an overflow sensor 586 and a chassis hole 587 to the external location 538 outside of the three dimensional printer 500.

In some examples, the water vapor from the water reservoir 532 of FIG. 5C can be provided to a two-way diverter valve 588 that also receives a gas from the lung 502. The two-way diverter valve 588 can transport the water vapor through a relative humidity and temperature sensor 589 and to an input location for the non-recycled build material vessel 590. In some examples, a gas output port 591 can transport gas through a relative humidity and temperature sensor 592 of the HTA 510. The gas can be provided to an external fan or blower 593, which blows the gas into the water reservoir 532.

Figure 6:
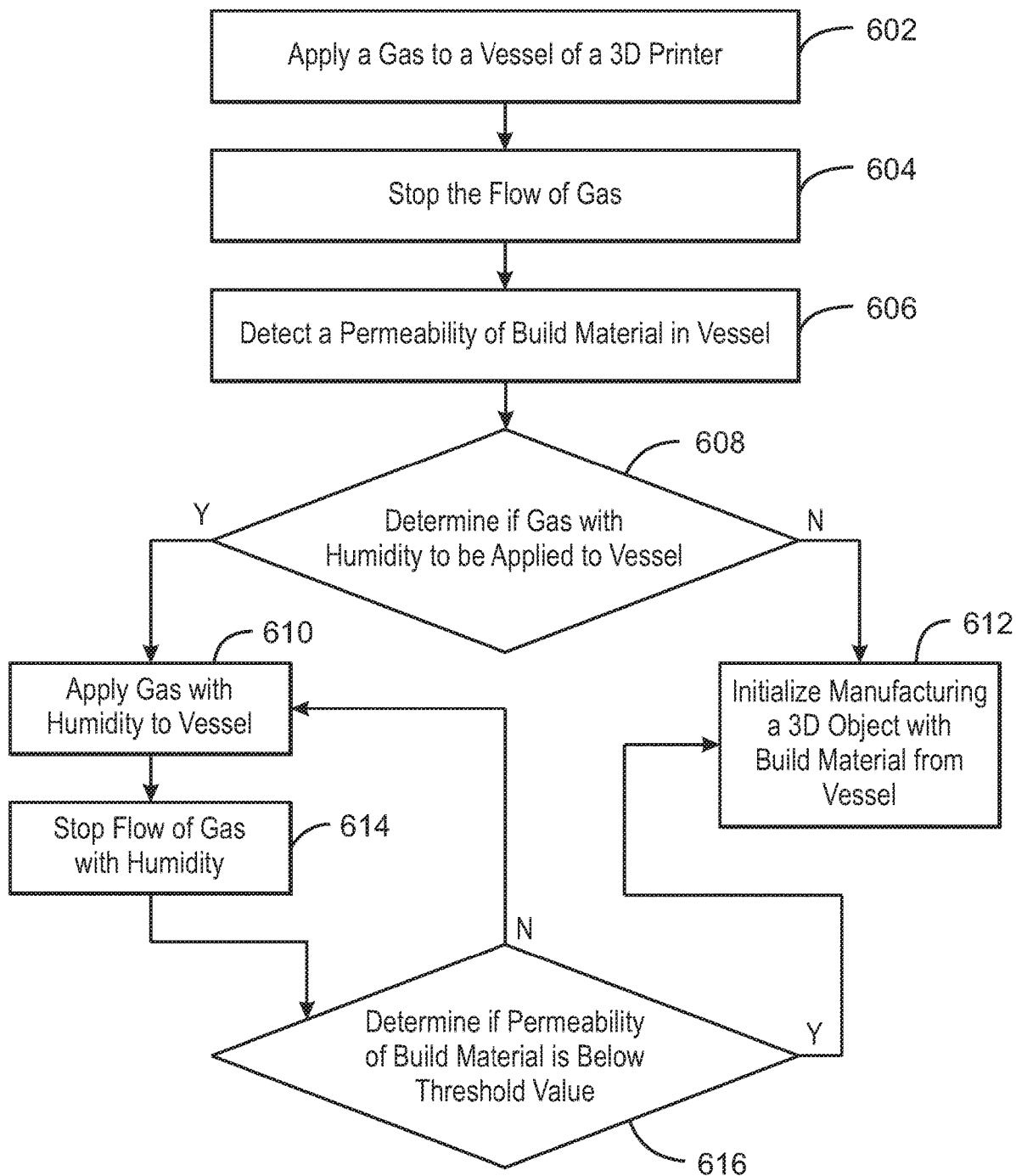
FIG. 6 is an example process flow diagram, in accordance with examples.

FIG. 6 is an example process flow diagram, in accordance with examples. The method begins at block 602 when a controller applies a gas with at least one flow rate to a vessel of a three dimensional printer, wherein the at least one flow rate is less than a fluidization rate. The vessel can include recycled build material, non-recycled build material, or recovered material as discussed above. The fluidization rate, as referred to herein, can indicate a rate of a gas entering a vessel that results in build material within the vessel becoming aerated, wherein the build material begins to separate and move vertically within the vessel. In some examples, the flow rate can be static or variable. For example, the controller may adjust the flow rate of the gas.

At block 604, the controller can stop the flow of the gas to the vessel. In some examples, the flow of gas to the vessel is stopped before detecting a permeability of build material residing within the vessel.

At block 606, a controller can detect a permeability of a build material residing within the vessel, wherein the permeability is calculated based on a plurality of pressure values detected by a plurality of pressure sensors residing in the vessel. For example, a vessel may have any suitable number of pressure sensors located at different heights within the vessel. In some examples, a pressure sensor can be located proximate a bottom of a vessel and a separate pressure sensor can be located proximate a top of the vessel. In some examples, any number of pressure sensors can be located at different heights within the vessel between a pressure sensor located proximate a bottom of a vessel and a pressure sensor located proximate a top of the vessel. The controller can detect a pressure differential based on the pressure sensor values and determine a permeability of the build material based on the pressure differential. For example, the controller can detect a change in pressure based on a height of a pressure sensor within a vessel to determine the permeability of the build material. The permeability can indicate a force to move gas through the build material. In some examples, a higher permeability indicates a higher level of tribocharging or static electricity in the build material, while a lower permeability indicates a lower level of tribocharging. In some examples, a lower permeability of the build material can enable the build material to be transported through conduit lines without becoming closely associated and forming clumps. Accordingly, the controller can detect a permeability of the build material to ensure that the build material does not clog conduit lines and to ensure that the build material is evenly distributed within the building enclosure of the three dimensional printer.

At block 608, the controller can determine if a gas with a predetermined humidity level is to be applied to the vessel. The gas with a predetermined humidity level can reduce the permeability of the build material and reduce tribocharging. By adjusting the permeability of a build material, the controller can increase the moisture content level and humidity of the build material, reduce any electrical charges or tribocharging within the build material and prevent the build material from forming clumps within transport lines of the 3D printer during a build process. In some examples, increasing the moisture content of build material can mitigate tribocharging at a faster rate. In some examples, permeability is correlated to moisture content of a build material so that a 3D printer can measure permeability of the build material to detect a moisture content of the build material and predict tribocharging of the build material. In some examples, an amount of humidity of the gas can be mapped to each different build material. For example, more permeable build materials may result from increased moisture content levels of the build materials. If the gas with a predetermined humidity level is to be applied to the vessel, the process continues at block 610. If the gas with a predetermined humidity level is not to be applied to the vessel, the process continues at block 612.

At block 610, the controller can apply a gas with a predetermined humidity level at a second flow rate to modify the permeability of the build material residing in the vessel. For example, the controller can operate actuators or valves, and the like, to enable a predetermined amount of humidity to be applied to the gas entering the vessel. In some examples, the predetermined amount of humidity can be based on a type of the build material. For example, build material that has been recycled from the building enclosure can be stored in a separate vessel from new build material that has not entered the building enclosure. In some examples, each type of build material may receive a different level of humidity with the gas. Additionally, the controller can determine the second flow rate to apply the gas and humidity to the vessel to minimize a time to reduce the permeability of the build material below a threshold value.

At block 614, the controller can stop the flow of the gas with the predetermined humidity level. For example, the controller can stop the flow of the gas with the predetermined humidity level to the vessel to enable calculating the modified permeability of the build material. In some examples, the controller can stop the flow of gas with the predetermined humidity level after a predetermined period of time. In some examples, the predetermined period of time can be based on the type of the build material. For example, a recycled build material may reach a permeability level below a threshold value within less time than a non-recycled or new build material.

At block 616, the controller can determine if the permeability of the build material is below a predetermined threshold. If so, the process continues at block 612. If not, the process returns to block 610. In some examples, the controller can modify the predetermined humidity level applied to the gas to any suitable value. Accordingly, the controller can use either static or variable humidity levels applied to the gas entering the vessel in response to detecting the permeability of the build material is not below a threshold value.

At block 612, the controller can initialize manufacturing a three dimensional object with the build material in response to detecting the permeability of the build material is below a predetermined threshold. For example, the controller can determine that a three dimensional object is to be manufactured in a build enclosure of the three dimensional printer with any combination of new build material and recycled build material. The controller can determine that the permeability of the new build material and/or recycled build material is below a threshold value. Accordingly, the controller can determine that the three dimensional object can be manufactured with the new build material and/or recycled build material without a tribocharging effect.

Figure 7:
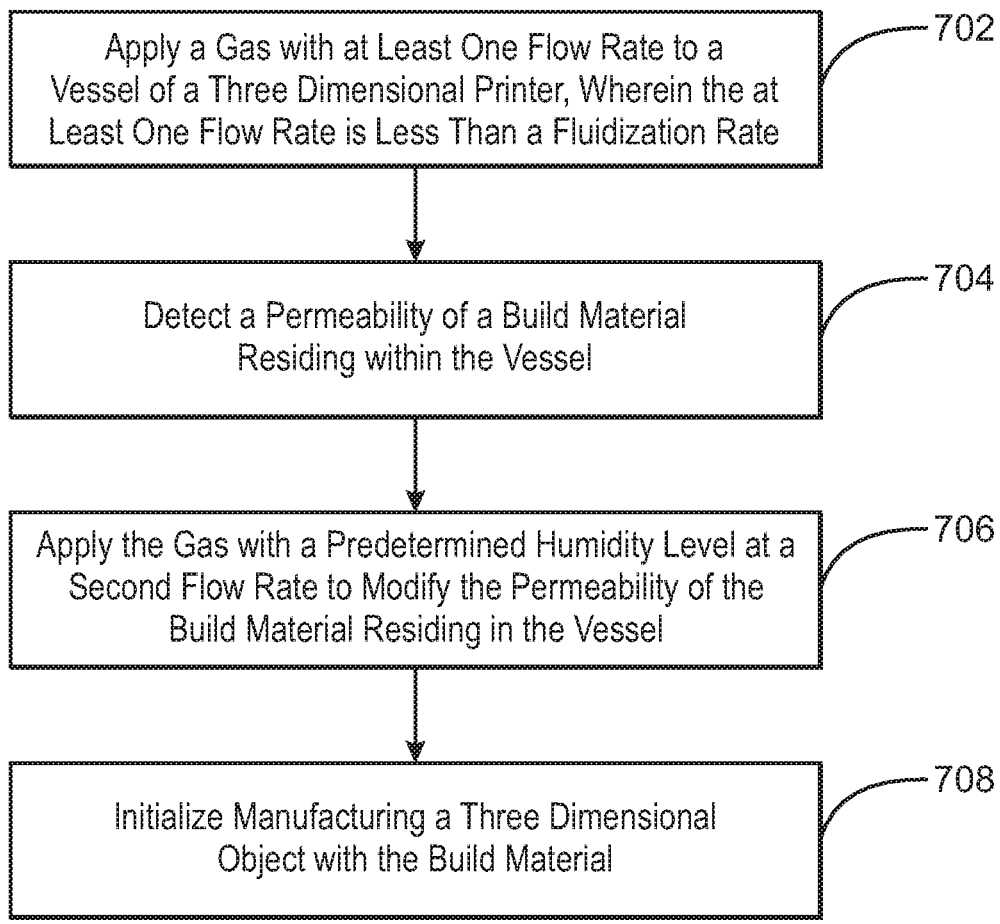
FIG. 7 is an example process flow diagram in accordance with examples.

FIG. 7 is an example process flow diagram in accordance with examples. The method begins at block 702 when a controller can apply a gas with at least one flow rate to a vessel of a three dimensional printer, wherein the at least one flow rate is less than a fluidization rate.

At block 704, a controller can detect a permeability of a build material residing within the vessel, wherein the permeability is calculated based on a plurality of pressure values detected by a plurality of pressure sensors residing in the vessel. The build material can include any suitable powder, among other substances, that can be used to manufacture a three dimensional object. For example, the build material can be a granular material with a narrow size distribution, such as beads, or other shapes of small solids that may flow and be conveyed in an air stream. As discussed above, "powder" as a build material can, for example, refer to a powdered, or powder-like, material which may be layered and sintered via an energy source or fused via a fusing agent, or a fusing agent and energy source in a 3D printing job. In some examples, the build material may be formed into a shape using a chemical binder, such as a solvent binder or a reaction promoter. The build material can be, for example, a semi-crystalline thermoplastic material, a metal material, a plastic material, a composite material, a ceramic material, a glass material, a resin material, or a polymer material, among other types of build material.

At block 706, a controller can result in the gas with a predetermined humidity level being applied at a second flow rate to modify the permeability of the build material residing in the vessel. In some examples, the predetermined humidity level of the gas is based on a time to reduce the permeability of the build material below a threshold value. In some examples, the controller can predict an amount of time for the predetermined humidity level of the gas to reduce the permeability of the build material below a threshold value. For example, the controller can apply the gas with the predetermined humidity level to the vessel for a minimal period of time to result in the build material reaching a target permeability level. In some examples, the predetermined humidity level corresponds to an amount of humidity to enter the vessel within a period of time that results in the permeability of the build material reaching the target level.

At block 708, the controller can initialize manufacturing a three dimensional object with the build material having a predetermined humidity level in response to detecting the permeability of the build material is below a predetermined threshold. In some examples, the controller can also adjust the predetermined humidity level of the gas in response to detecting the permeability of the build material is below the predetermined threshold. For example, the controller can modify the predetermined humidity level of the gas applied to the vessel to maintain the permeability of the build material within a range for manufacturing a three dimensional object. In some examples, the controller can adjust the predetermined humidity level of the gas to a lower humidity level in response to detecting the permeability of the build material is below the predetermined threshold. For example, the controller can reduce the amount of moisture entering the vessel with the gas to maintain the permeability of the build material within a predetermined range. In some examples, the controller can monitor the pressure values of the vessel during the manufacturing of the three dimensional object and change the lower humidity level of the gas to a higher level humidity level in response to detecting the permeability of the build material is above the predetermined threshold. Accordingly, the controller can modify the humidity level of the gas applied to the vessel during the manufacturing of a three dimensional object to ensure that the build material has a permeability within a predetermined range.

Figure 8:
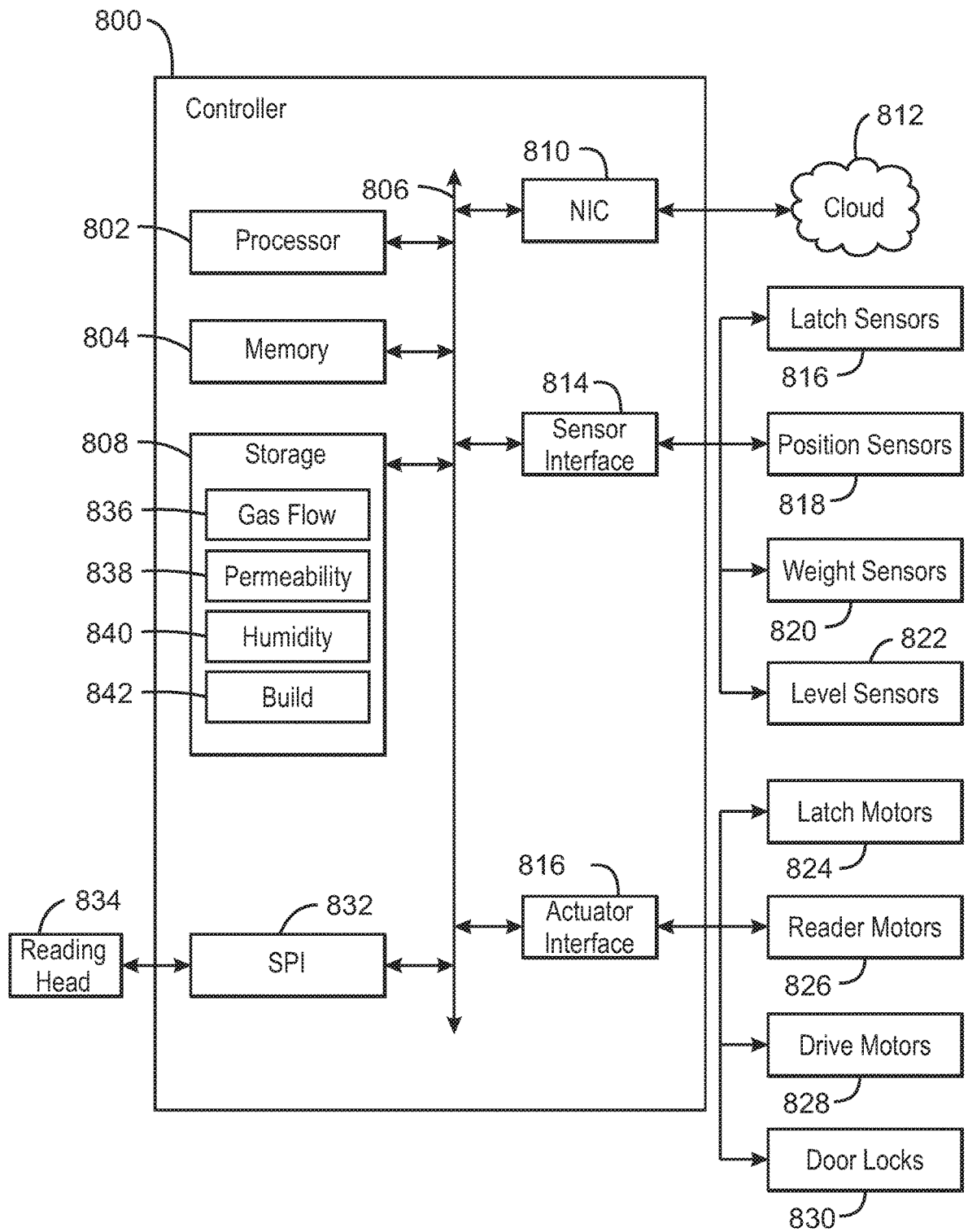
FIG. 8 is an example controller for operating a 3D printer, in accordance with examples.

FIG. 8 is an example controller for operating a 3-dimensional printer, in accordance with examples. The controller 800 may be part of the main controller for the 3D printer.

The controller 800 may include a processor 802, which may be a microprocessor, a multi-core processor, a multi-threaded processor, an ultra-low voltage processor, an embedded processor, or other type of processor. The processor 802 may be an integrated microcontroller in which the processor 802 and other components are formed on a single integrated circuit board, or a single integrated circuit, such a system on a chip (SoC). As an example, the processor 802 may include a processor from the Intel® Corporation of Santa Clara, Calif., such as a Quark™, an Atom™, an i3, an i5, an i7, or an MCU-class processor. Other processors that may be used may be obtained from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 802 may communicate with a system memory 804 over a bus 806. Any number of memory devices may be used to provide for a given amount of system memory. The memory may be sized between about 2 GB and about 64 GB, or greater. The system memory 804 may be implemented using non-volatile memory devices to protect from power loss, such as static RAM (SRAM), or memory modules having backup power, for example, from batteries, super-capacitors, or hybrid systems.

Persistent storage of information such as data, applications, operating systems, and so forth, may be performed by a mass storage 808 coupled to the processor 802 by the bus 806. The mass storage 808 may be implemented using a solid-state drive (SSD). Other devices that may be used for the mass storage 808 include flash memory cards, such as SD cards, microSD cards, xD picture cards, and the like, and USB flash drives. In some examples, the controller 800 may have an accessible interface, such as a USB connection, an SD card socket, or a micro-SD socket to all the insertion of memory devices with build plans, instructions, and the like.

In some examples, the mass storage 808 may be implemented using a hard disk drive (HDD) or micro HDD. Any number of other technologies may be used in examples for the mass storage 808, such resistance change memories, phase change memories, holographic memories, or chemical memories, among others.

The components may communicate over the bus 806. The bus 806 may include any number of technologies, such as industry standard architecture (ISA), extended ISA (EISA), peripheral component interconnect (PCI), peripheral component interconnect extended (PCIx), PCI express (PCIe), or any number of other technologies. The bus 808 may include proprietary bus technologies, for example, used in a SoC based system. Other bus systems may be included, such as an I2C interface, I3C interface, an SPI interface, point to point interfaces, and a power bus, among others. A network interface controller (NIC) 810 may be included to provide communications with a cloud 812 or network, such as a local area network (LAN), a wide area network (WAN), or the Internet.

The bus 806 may couple the processor 802 to interfaces 814 and 816 that are used to connect to other devices in the 3D printer. For example, a sensor interface 814 may be used to couple to latch sensors 816 to detect if a build material container is latched in a supply station, and position sensors 818 to detect if a build material container is in a base position in a supply station. Other sensors that may be present in examples include weight sensors 820 to determine the weights of various containers or vessels, such as the supply stations, the new material vessel, the recycle material vessel, or the recovered material vessel, among others. Level sensors 822 may be coupled to the sensor interface 814 to monitor the level of build material in various vessels, such as the new material vessel, the recycle material vessel, or the recovered material vessel, among others.

An actuator interface 816 may be included to control various actuators in the 3D printer. The actuators may include latch motors 824, to release build material containers from supply stations, and reader motors 826 to move reading heads towards, and away from, information chips on build material containers. Drive motors 828 may be used to rotate cylindrical cages that hold build material containers. The drive motors 828 may be stepper motors, server motors, or other kinds of motors that have rotation controlled by the supplied power signal, allowing the number of revolutions per minute in total revolutions to be controlled by the actuation. In some examples, a sensor may be used to determine the number of revolutions, for example, the position sensors 818 may be used to count the number of revolutions of the cylindrical cage in the new supply station or the recycle supply station. The actuation interface 816 may also couple to door locks 830 which may be used to lock the doors to prevent access to the build material containers while they are being moved.

A serial peripheral interface (SPI) 832 may be coupled to the reading head 834 for interface with an information chip. Other types of interfaces may also be used to read the information chip, such as a two wire 120 serial bus. In some examples, the information chip may be accessed through an RFI system.

While not shown, various other input/output (I/O) devices may be present within, or connected to, the controller 800. For example, a display panel may be included to show information, such as build information, action prompts, warnings of incorrect material, or messages concerning status of doors, build material containers, and the like. Audible alarms may be included to alert a user of a condition. An input device, such as a touch screen or keypad may be included to accept input, such as instructions on new builds, and the like.

The mass storage 808 may include modules to control the supply stations, as described herein. Although shown as code blocks in the mass storage 808, it may be understood that any of the modules may be fully or partially implemented in hardwired circuits, for example, built into an application specific integrated circuit (ASIC). The modules may generally be used to implement the functions described with respect to FIGS. 6 and 7.

In some examples, a gas flow module 836 may implement the general functions for applying a gas with at least one flow rate to a vessel of a three dimensional printer, wherein the at least one flow rate is less than a fluidization rate. In some examples, a permeability module 838 may detect a permeability of a build material residing within the vessel, wherein the permeability is calculated based on a plurality of pressure values detected by a plurality of pressure sensors residing in the vessel. In some examples, a humidity module 840 may apply the gas with a predetermined humidity level at a second flow rate to modify the permeability of the build material residing in the vessel.

Other functions may be present, including, for example, a build module 842. The build module 842 may direct the build procedure for forming the 3D object. For example, the build module 842 may initialize manufacturing a three dimensional object with the build material in response to detecting the permeability of the build material is below a predetermined threshold.

Figure 9:
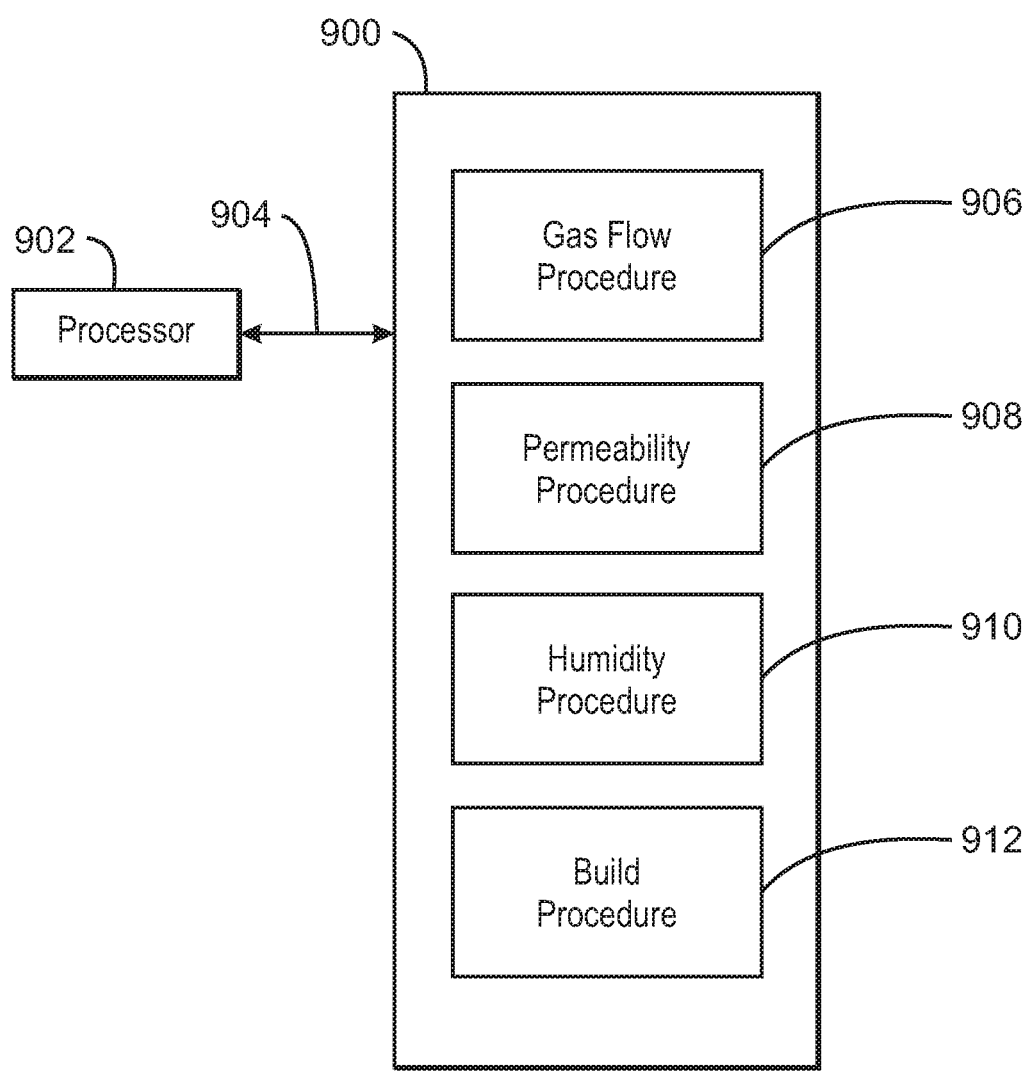
FIG. 9 is a block diagram of a non-transitory, machine-readable medium attached to a 3D printer, in accordance with examples.

FIG. 9 is a block diagram of a non-transitory, machine-readable medium attached to a 3-dimensional printer, in accordance with examples. Like numbered items are as described with respect to previous figures. The non-transitory, machine readable medium 900 may implement the functionalities of the controller 8 of FIG. 8. A processor 902, for example, in a control system of a three dimensional printer, may access the non-transitory, machine readable medium 900, as indicated by arrow 904.

The non-transitory, machine readable medium 900 may include code 906 to direct the processor 902 to implement a gas flow procedure, such as, applying a gas with at least one flow rate to a vessel of a three dimensional printer, wherein the at least one flow rate is less than a fluidization rate. The non-transitory, machine readable medium 900 may also include parameters for the permeability procedure 908, which may include detecting a permeability of a build material residing within the vessel, wherein the permeability is calculated based on a plurality of pressure values detected by a plurality of pressure sensors residing in the vessel. The non-transitory, machine readable medium 900 may also include parameters for the humidity procedure 910, which may include applying the gas with a predetermined humidity level at a second flow rate to modify the permeability of the build material residing in the vessel. In some examples, the non-transitory, machine readable medium 900 may also include parameters for the build procedure 912, which may include initializing manufacturing a three dimensional object with the build material in response to detecting the permeability of the build material is below a predetermined threshold.

Other parameters and procedures may also be stored on the non-transitory, machine readable medium 900. For example, the non-transitory, machine readable medium 900 may include a material type for a build material in the build material container.

While the present techniques may be susceptible to various modifications and alternative forms, the examples discussed above have been shown by way of example. It is to be understood that the techniques are not intended to be limited to the particular examples disclosed herein. Indeed, the present techniques include all alternatives, modifications, and equivalents falling within the scope of the present techniques.

What is claimed is:

1. A system for manufacturing three dimensional objects comprising:
   logic to:
   apply a gas with at least one flow rate to a vessel of a three dimensional printer;
   detect a permeability of the build material residing within the vessel, wherein the permeability is calculated based on a plurality of pressure values detected by a plurality of pressure sensors residing in the vessel;
   apply the gas with a predetermined humidity level at a second flow rate; and
   initialize manufacturing a three dimensional object with the build material having a predetermined humidity level in response to detecting the permeability of the build material is below a predetermined threshold.

2. The system of claim 1, wherein the logic is to adjust the predetermined humidity level of the gas in response to detecting the permeability of the build material is below the predetermined threshold.

3. The system of claim 1, wherein the plurality of pressure sensors reside at different heights of the vessel.

4. The system of claim 1, wherein the logic is to determine the predetermined humidity level of the gas based on a type of the build material and the permeability of the build material.

5. The system of claim 4, wherein the type of the build material comprises a recycled build material or a non-recycled build material.

6. The system of claim 1, wherein the logic is to predict an amount of time for the predetermined humidity level of the gas to reduce the permeability of the build material below a threshold level.

7. The system of claim 1, wherein the logic is to adjust the predetermined humidity level of the gas to a lower humidity level in response to detecting the permeability of the build material is below the predetermined threshold.

8. The system of claim 7, wherein the logic is to monitor the pressure values of the vessel during the manufacturing of the three dimensional object and change the lower humidity level of the gas to a higher level humidity level in response to detecting the permeability of the build material is above the predetermined threshold.

9. A method for manufacturing three dimensional objects comprising:
- applying a gas with at least one flow rate to a vessel of a three dimensional printer, wherein the at least one flow rate is less than a fluidization rate of a build material in the vessel;
- detecting the permeability of the build material residing within the vessel;
- applying the gas with a predetermined humidity level at a second flow rate to modify a permeability of the build material residing in the vessel; and
- initializing manufacturing a three dimensional object with the build material having a predetermined humidity level in response to detecting the permeability of the build material is below a predetermined threshold.

10. The method of claim 9, comprising adjusting the predetermined humidity level of the gas in response to detecting the permeability of the build material is below the predetermined threshold.

11. The method of claim 9, wherein the plurality of pressure sensors reside at different heights of the vessel.

12. The method of claim 9, comprising detecting the predetermined humidity level of the gas based on a type of the build material.

13. The method of claim 12, wherein the type of the build material comprises a recycled build material or a non-recycled build material.

14. The method of claim 9, comprising predicting an amount of time for the predetermined humidity level of the gas to reduce the permeability of the build material below a threshold level.

15. A three dimensional printer for manufacturing three dimensional objects comprising:
- a humidifier management system to apply a gas with at least one flow rate to a vessel of the three dimensional printer, wherein the at least one flow rate is less than a fluidization rate of a build material in the vessel; and apply the gas with a predetermined humidity level at a second flow rate to modify the permeability of the build material residing in the vessel in response to detecting a permeability of the build material; and
- a controller to detect the permeability of the build material residing within the vessel, wherein the permeability is calculated based on at least one pressure value detected by at least one pressure sensor residing in the vessel, and initialize manufacturing a three dimensional object with the build material having a predetermined humidity level in response to detecting the permeability of the build material is below a predetermined threshold.

* * * * *